United States Patent
Chartier et al.

(10) Patent No.: US 9,311,620 B2
(45) Date of Patent: Apr. 12, 2016

(54) SYSTEM AND PROCESS FOR RANKING CONTENT ON SOCIAL NETWORKS SUCH AS TWITTER

(75) Inventors: Timothy P. Chartier, Davidson, NC (US); Amy N. Langville, Charleston, SC (US); Lake Trask, Davidson, NC (US)

(73) Assignees: Trustees of Davidson College, Davidson, NC (US); College of Charleston, Charleston, SC (US)

( * ) Notice: Subject to any disclaimer, the term of this patent is extended or adjusted under 35 U.S.C. 154(b) by 316 days.

(21) Appl. No.: 13/278,653

(22) Filed: Oct. 21, 2011

(65) Prior Publication Data

US 2012/0102113 A1 Apr. 26, 2012

Related U.S. Application Data

(60) Provisional application No. 61/405,381, filed on Oct. 21, 2010.

(51) Int. Cl.
| | |
|---|---|
| *G06F 15/16* | (2006.01) |
| *G06Q 10/10* | (2012.01) |
| *G06Q 10/06* | (2012.01) |
| *H04L 29/08* | (2006.01) |

(52) U.S. Cl.
CPC ............... *G06Q 10/10* (2013.01); *G06Q 10/06* (2013.01); *H04L 29/08072* (2013.01)

(58) Field of Classification Search
CPC .............. H04L 29/08072; H04L 29/06; H04L 29/08144
USPC .................................. 709/204, 220, 224, 223
See application file for complete search history.

(56) References Cited

U.S. PATENT DOCUMENTS

| 7,200,673 | B1 * | 4/2007 | Augart .......................... 709/238 |
| 8,965,409 | B2 * | 2/2015 | Abhyanker ................ 455/456.3 |
| 2004/0157684 | A1 | 8/2004 | Craven, Jr. et al. |
| 2007/0191102 | A1 * | 8/2007 | Coliz et al. ...................... 463/42 |
| 2008/0176655 | A1 * | 7/2008 | James ................. G06F 19/3475 463/42 |
| 2009/0177745 | A1 * | 7/2009 | Davis et al. .................... 709/204 |
| 2010/0094878 | A1 | 4/2010 | Soroca et al. |
| 2010/0205541 | A1 | 8/2010 | Rapaport et al. |
| 2011/0213785 | A1 * | 9/2011 | Kristiansson et al. ........ 707/748 |
| 2011/0246457 | A1 * | 10/2011 | Dong et al. .................... 707/725 |
| 2013/0066884 | A1 * | 3/2013 | Kast et al. ...................... 707/748 |

(Continued)

OTHER PUBLICATIONS

'Ranking Theory with Application to Popular Sports', published Dec. 2, 2008 by "Govan, Anjela Yuryevna".*
International Search Report of PCT/US2011/057314 filed Oct. 21, 2011 in the name of Davidson College.

(Continued)

*Primary Examiner* — Khanh Dinh
(74) *Attorney, Agent, or Firm* — Baker & Hostetler LLP (57) ABSTRACT

A system and process for ranking at least one of the quality and importance of content on a social network is disclosed. The system and process include monitoring one of actions and information of social network users, determining whether the actions or information of the social network users fits a predefined definition of a game between at least two social network users, determining the results of the game between the at least two social network users, applying a sports ranking algorithm to the results between the at least two social network users, and determining a rank of at least one of the quality and importance of content of the social network users based on an outcome of the sports ranking algorithm.

20 Claims, 3 Drawing Sheets

(56) References Cited

U.S. PATENT DOCUMENTS

2013/0297590 A1* 11/2013 Zukovsky et al. ............ 707/722
2015/0293897 A1* 10/2015 Myslinski .............. G06Q 10/06
707/755

OTHER PUBLICATIONS

Chartier et al. "Who's Most Twitterific?" pp. 1-10.
Cahrtier et al. "Sports Ranking and Twitter"—Department of Mathematics, Davidson College, pp. 1-6.

* cited by examiner

FIGURE 1

| Twitter user | Wins | Losses | Win % | Colley Rank | PageRank |
|---|---|---|---|---|---|
| Justin Bieber | 21 | 0 | 100.00% | 1 | 10 |
| Barack Obama | 37 | 0 | 100.00% | 2 | 2 |
| CNN Breaking News | 29 | 0 | 100.00% | 3 | 9 |
| The Onion | 16 | 0 | 100.00% | 4 | 23 |
| Zappos | 15 | 0 | 100.00% | 5 | 33 |
| Guy Kawasakit | 14 | 0 | 100.00% | 6 | 50 |
| Lady Gaga | 20 | 1 | 95.00% | 7 | 35 |
| Britney Spears | 20 | 0 | 100.00% | 8 | 40 |
| Oprah | 39 | 8 | 82.97% | 9 | 6 |
| Stephen Colbert | 20 | 0 | 95.00% | 10 | 24 |

FIGURE 2

| Twitter user | Wins | Losses | Ties | Win % | Colley Rank | PageRank |
|---|---|---|---|---|---|---|
| iamch0pper | 16 | 0 | 0 | 100.00% | 1 | 11 |
| RasualButler45 | 18 | 0 | 0 | 100.00% | 2 | 4 |
| itsameriie | 15 | 0 | 0 | 100.00% | 3 | 18 |
| MikeVick | 62 | 0 | 2 | 96.87% | 4 | 20 |
| carmeloanthony | 117 | 1 | 3 | 96.69% | 5 | 35 |
| 1stKlassAgency | 4 | 0 | 0 | 100.00% | 6 | 9 |
| AngelaSimmons | 41 | 0 | 0 | 100.00% | 7 | 1 |
| johndnetsfan | 5 | 0 | 0 | 100.00% | 8 | 37 |
| IamTinaThompson | 8 | 0 | 0 | 100.00% | 9 | 29 |
| HootSuite | 12 | 0 | 0 | 100.00% | 10 | 6 |

FIGURE 3

SYSTEM AND PROCESS FOR RANKING CONTENT ON SOCIAL NETWORKS SUCH AS TWITTER

CROSS REFERENCE TO PRIOR APPLICATIONS

This application claims the benefit from U.S. Provisional Application No. 61/405,381 filed on Oct. 21, 2010, which is hereby incorporated by reference for all purposes as if fully set forth herein.

BACKGROUND OF THE DISCLOSURE

1. Field of the Disclosure

This disclosure is directed to a system and process for ranking the quality and/or importance of content on social networks such as Twitter, and particularly to a system and process for ranking the quality and/or importance of content on social networks such as Twitter using sports ranking processes.

2. Related Art

A number of well-known entities rank content based on user web browsing activities on the World Wide Web. The subsequent rankings are then used to derive a ranking of a webpage content that then may be subsequently used. For example, when you submit a query to Google, the order of the webpages are based on the relevance of the page to your submitted text (for instance, a search on "wildcat" would return a very different set of webpages than a search on "calculus") and the "importance" of the page. Google uses an algorithm called PageRank to derive a measure of importance or quality of a webpage. This algorithm is based on a model of web surfing.

The PageRank model is relatively simple, in a certain sense, although its scalability is one of its most notable features. First, it assumes that 85% of the time you will follow links on a webpage. In particular, you have an equally likely chance of following any link on a given webpage. The remaining 15% of the time you will teleport to any webpage again with equal likelihood. When this model surfer reaches a webpage with no outlinks, the surfer will teleport to any webpage with equal likelihood. This is an idealized form of web surfing but the success of Google reflects how the model yields insightful results.

More specifically, PageRank is a link analysis algorithm that assigns a numerical weighting to each element of a hyperlinked set of documents, such as the World Wide Web, with the purpose of "measuring" its relative importance within the set. The algorithm may be applied to any collection of entities with reciprocal quotations and references. The numerical weight that it assigns to any given element E is referred to as the PageRank of E and denoted by PR(E).

While ranking content of the World Wide Web using, for example, a PageRank model of surfing works, there are places where it does not appear to apply as accurately to a social network. Accordingly, there is a need for a way in which to more accurately rank the importance or quality of content in a social network and give more insightful and helpful results than prior art ranking approaches such as PageRank.

SUMMARY OF THE DISCLOSURE

According to an aspect of the disclosure, a computer system includes a tangible storage medium that when executed on the computer system ranks at least one of the quality and importance of content on a social network, the tangible storage medium including instructions for monitoring one of actions and information of social network users, instructions for determining whether the actions or information of the social network users fits a predefined definition of a game between at least two social network users, instructions for determining the results of the game between the at least two social network users, instructions for applying a sports ranking algorithm to the results between the at least two social network users, and instructions for determining a rank of at least one of the quality and importance of content of the social network users based on an outcome of the sports ranking algorithm.

According to another aspect of the disclosure a process for ranking at least one of the quality and importance of content on a social network includes monitoring one of actions and information of social network users, determining whether the actions or information of the social network users fits a predefined definition of a game between at least two social network users, determining the results of the game between the at least two social network users, applying a sports ranking algorithm to the results between the at least two social network users, and determining a rank of at least one of the quality and importance of content of the social network users based on an outcome of the sports ranking algorithm.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The sheer amount of people who use online social networks regularly has turned them into important tools that can be used by advertisers and businesses. With these uses for online social networks growing, some important issues need to be considered. Logically, the quickest way to spread information would be to have someone of great importance on the network advocate it.

The invention provides a system and process to determine what users may be important compared to others. The invention has a number of applications that may be used with social networks. Moreover, it is contemplated that the applications may be used in other types of environments as well. However, for simplicity the invention will be described with respect to Twitter as a non-limiting example.

The invention may include two main concepts. First, data is rated within a social network as a network of games. Games can be, as in Twitter in its most basic form, who follows who. However, the invention may be easily extended to involve retweets, mentions, and such on Twitter and adapted easily to other environments with Twitter only being an example. Then the results of the games are ranked using a ranking method. Colley and Massey are two methods used for ranking, but the ranking, method may be a method adapted to other sports ranking methods, of which there are many. Indeed, a main part of this approach is treating decisions to follow, link, retweet or whatever to be a game which allows one to adapt such methods. Second, the use of weighting of the games may be beneficial for the invention. While sports ranking may generally not weight games, many such applications want and are benefited by placing more weight in one manner or another such as on current activity. It may even be worth noting that such methods may be adapted to the World Wide Web as a method to replace PageRank.

A way to look at Twitter is as a directed graph, where a directed edge exists from user A to user B if user A follows user B. Web ranking methods such as Google's PageRank algorithm have been used to produce rankings of the graph where the edges represent links. However, Twitter is not used in the same way as the full Internet, and the random surfer model for PageRank may typically not be the best model for Twitter. The invention adapts sports ranking methods to Twitter, ranking users by importance. Using sports ranking methods provides ratings showing importance and/or quality that is not capable of the prior art rankings systems such as PageRank.

Over the past few years social networks have experienced rapid growth and immense popularity, and some, such as Facebook and Twitter, are on their way to becoming a part of everyday life for many people. Due the large number of users, the Twitter network has even arguably evolved into more than just a social network. Inherent in the way the network is designed lays the ability for information to surface and spread with incredible speed. In light of this, the network can be utilized in many ways beyond its roots as a social network.

Users of the network "tweet" by sending a text-based post of up to 140 characters. These tweets are sent to a user's followers, i.e. users that subscribe to the author's tweets. This action of following directs future tweets from the author onto the user's Twitter website or to a compatible external application (like a smartphone or the like).

Due to the speed at which tweets from Twitter users reach their followers, the network has the potential to be a source of up to the minute information and news. In many ways, Twitter may be better than prior art search engines, as one can argue tweets spread significantly faster than the information can be found using a search engine.

However, in order to find the pertinent information, one first has to sort through the immense number of tweets constantly being posted. The system and process of the invention provides an approach to ranking users on the network as a way to help address this issue by assigning the quality and/or importance to these tweets.

Figure 1:
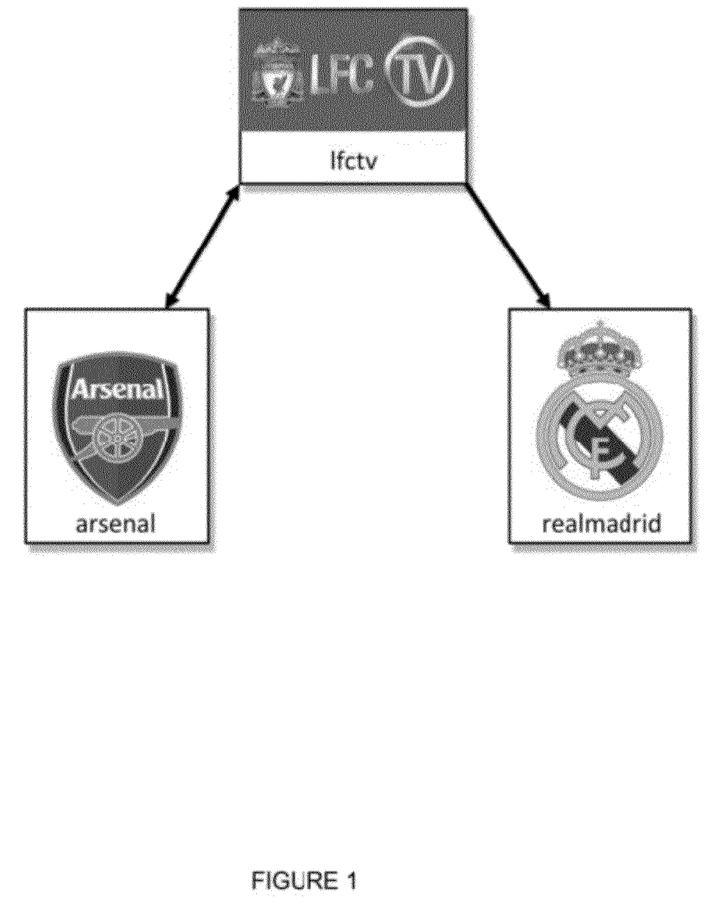
FIG. 1 shows a directed graph of a subset of Twitter accounts as processed according to the principles of the disclosure.

The manner in which the system and process determines the quality and/or importance of content on a social network, such as Twitter, is to view Twitter as a graph where a node is a Twitter user and an edge from node A to node B indicates that user A is following user B on Twitter. For an initial example, consider the network created by the Twitter accounts of the soccer teams Liverpool FC, Arsenal FC, and Real Madrid CF. In FIG. 1 we see that Liverpool's Twitter account LFCTV follows Real Madrid's account realmadrid and the Twitter account, arsenal, of Arsenal FC. We further see that Arsenal follows Liverpool. The significance of this relationship is discussed below.

3. Surfing Over Tweets

Keep in mind that Twitter can be viewed as a series of webpages. Without even being a user of Twitter, you can view tweets from Liverpool by simply visiting http://www.twitter.com/LFCTV. If you do, you'll see how many users Liverpool follows and how many are following Liverpool. In fact, it is also possible to click a link on the LFCTV Twitter page and be directed to a follower's page. So, we can, if we wish, apply web ranking algorithms to Twitter. The PageRank algorithm is used by Google to rank webpages based on the connectivity of the web, and is a choice for an initial method to try and apply to a web network like Twitter.

The edge from LFCTV to realmadrid indicates Liverpool FC follows Real Madrid CF on Twitter. Returning to the web graph in FIG. 1, if a random surfer is on the webpage for Liverpool's Twitter account and confined only to this network, then the model assumes that with 85% probability, the surfer will randomly follow a link on that webpage. With 15% probability, the surfer will randomly visit any page in the network, which is sometimes called teleportation. If you are at a page with no outlinks, like Real Madrid on this small network, then you randomly visit any page in the network. So, if a surfer is at the Real Madrid page, then there is a 33.3% chance of the surfer visiting any page, including the Real Madrid page. If a surfer is at the Liverpool page, the surfer has as a 15/3=5% probability of returning to the Liverpool page and an (85/2+15/3)=47.5% probability of visiting either Arsenal's or Real Madrids' page. A page's web rating according to PageRank is the proportion of time the random surfer will visit that webpage over an infinite number of steps. We can find such probabilities by finding the dominant eigenvector of the stochastic matrix associated with this random process. We will let $G_{i,j}$ equal the probability to moving from webpage i to webpage j. So, from FIG. 1 we have:

$$G = \begin{matrix} & \text{Liverpool} & \text{RealMadrid} & \text{Arsenal} \\ \text{Liverpool} & 0.050 & 0.475 & 0.475 \\ \text{RealMadrid} & 0.333 & 0.333 & 0.333 \\ \text{Arsenal} & 0.900 & 0.050 & 0.050 \end{matrix}$$

The dominant left eigenvector of G is (0.3936, 0.3032, 0.3032) which gives us the rating of the webpages. We see here that Liverpool is ranked first, followed by a tie between the pages for Real Madrid and Arsenal.

PageRank is a simplified model of web surfing and doesn't exactly emulate most surfing sessions. It is accurate, though, in modeling a simplified surfing session. However, the PageRank model does not necessarily apply as well to a social network like Twitter as it does to an arbitrary network of webpages on the World Wide Web.

Twitter differs from a general web network. While it has hyperlinks, the network isn't designed, at least as specifically, for surfing. In fact, many smartphone applications are designed such that one never needs to visit the Twitter webpages. A user generally doesn't surf from account to account to get information. Twitter's network is based on decisions to follow or not to follow other users. The web is similar as web designers decide to link or not to link to other sites. For a webpage, however, the decision to link is intended to lead a surfer to another webpage. For a Twitter user, the decision to follow another user is intended to receive that person's tweets and isn't, at least in the same way, meant to lead other users to that user, although an action known as "retweeting," where one user tweets another user's exact tweet while simultaneously citing them in the post, can play this role.

One important aspect of the PageRank model is "teleportation." This concept is based on the fact that a web surfer will jump to a brand new webpage by entering a new URL 15% of the time or every time a webpage with no outlinks is reached. Teleportation is important both in a modeling sense, and in the actual computation of the ratings within the algorithm. However, this concept would not seem to apply as a Twitter user is largely confined to a reader which displays tweets and will rarely come across a tweet by a new random user. One could argue that PageRank could still be applied with the teleportation factor simply set at 0%, but this causes problems with the computation of the PageRank vector on nearly all real Twitter networks. Thus, a concept that is considered critical to PageRank becomes largely unimportant in modeling the Twitter network.

On the web, the author of a webpage is generally unaware of another webpage linking to that page. However, knowing who follows you is easy on Twitter; in fact, Twitter will send an email with each new follower. Some Twitter tutorials recommend looking at a new follower's Twitter profile in order to decide whether to return the decision to follow. As such, you may decide to follow me but I may decide not to follow you. Such decisions are easily seen to be made by users, like Barack Obama, who follows less than a million users but is followed by several million.

5. Competing for Followers

To rank Twitter accounts, we may apply sports ranking algorithms that are designed to measure the "best" team. We may then determine what can be considered games and/or determine what is considered as winning and losing on Twitter. In one example; suppose John D. has a Twitter account and decides to follow Jane P., then John is recommending Jane. However, the decision to follow is not necessarily mutual since Jane may decide not to follow John. We model this decision process as a game that occurs when a Twitter user follows another. If John follows Jane, then Jane wins the game. If Jane follows John, then John wins the game. If both users choose to follow each other, we can model it either as two games, with each user winning one and losing one, or perhaps more appropriately as a tie. In a "tie" situation, only one game is counted. Each participating user may be awarded half of a win and half of a loss. In this way, sports ranking methods can rank the users. It should be noted that other manners in determining what is considered as winning and losing and what is considered a game are within the scope and spirit of the invention.

The most basic sports ranking method is simply to use winning percentage. However, this may be easily manipulated and may fail to pick up many subtleties of the network. To lean on the sports metaphor, we don't merely want to consider the records of the teams but rather a sense of their record given their strength of schedule. If one sports team beats a poor team, the change in rating shouldn't be the same as beating a good team. In the same way, if an influential user follows someone, that should raise the user's rating more than having a relatively isolated Twitter account follow them.

The Colley method, one of the ranking methods used by the Bowl Championship Series to determine which college football teams are invited to which bowl games, contains such interdependence of teams. For completeness, we will motivate the method from winning percentage, in which the rating of team i is $r_i = w_i/t_i$; where $w_i$ and $t_i$ are the number of wins and total games for team i. Again, we will consider two users on Twitter to compete in a game whenever one user follows another; the winner of the game is the user who is followed. A single tied game models the case where both users follow each other where a tie equates to half a win and half a loss for each team. Working from winning percentage, we may apply Laplace's rule of succession, which transforms the standard winning percentage into $$r_i = \frac{1 + w_i}{2 + t_i} \quad (1)$$

This minor change may appear to be of little help, but Colley, used it as a stepping stone to a more powerful result.

We now focus on rewriting the number of wins for a user as $$w_i = \frac{w_i - l_i}{2} + \frac{w_i - l_i}{2} = \frac{w_i - l_i}{2} + \frac{t_i}{2}.$$

Now, $$\frac{t_i}{2} = \frac{1}{2}(1 + 1 + \ldots + 1) = \left(\frac{1}{2} + \frac{1}{2} + \ldots + \frac{1}{2}\right).$$

If no games were played, all ratings would be ½. The ratings continue to hover around ½ as wins and losses occur between users who, in this scenario, are opponents in the context of each game. So, ½(total games)≈(sum of opponents' ratings for all games played), Or $$\frac{1}{2} t_i \approx \sum_{j \in O_i} r_j,$$

where $O_i$ is the set of opponents for user i. Substituting this back into our equation for $w_i$ we get $$w_i \approx \frac{w_i - l_i}{2} + \sum_{j \in O_i} r_j. \quad (2)$$

This substitution is approximate as the average over all opponents' ratings may not be ½ since, for one thing, each user may not play a game with every other user.

Assuming equality in (2) and inserting this into (1) produces $$r_i = \frac{1 + (w_i - l_i)/2 + \sum_{j \in O_i} r_j}{2 + t_i}. \quad (3)$$

The advantage of this representation is that we now have the interdependence of our users' ratings. That is, user i's rating depends on the ratings $r_j$ of all his or her opponents. This procedure for computing ratings is called the Colley method.

While each $r_i$ can be computed individually using (3), an equivalent formulation uses a linear system:

$$Cr = b \quad (4)$$

where C is the so-called Colley matrix. This linear system is derived from (3) as follows. It is easiest to see the contributions of (3) if it is written as:

$$(2 + t_i)r_i - \sum_{j \in O_i} r_j = 1 + \frac{1}{2}(w_i - l_i). \quad (5)$$

The vector b has components $b_i = 1 + \frac{1}{2}(w_i - l_i)$. The diagonal elements of the Colley coefficient matrix C are $2 + t_i$ and the off-diagonal elements $c_{i,j}$, for $i \neq j$, are $-n_{i,j}$, where $n_{i,j}$ is the number of games between users i and j.

For FIG. 1, the linear system for the Colley method becomes:

$$\begin{pmatrix} 5 & -1 & -2 \\ -1 & 3 & 0 \\ -2 & 0 & 4 \end{pmatrix} \begin{pmatrix} r_1 \\ r_2 \\ r_3 \end{pmatrix} = \begin{pmatrix} \frac{1}{2} \\ \frac{3}{2} \\ \frac{2}{1} \end{pmatrix},$$

where $r_1$, $r_2$ and $r_3$ are the ratings for Liverpool, Real Madrid, and Arsenal, respectively. Solving the linear system, we find the ratings of Liverpool, Real Madrid and Arsenal to be 0.4091, 0.6364 and 0.4545, respectively. A sports ranking method such as Colley creates interdependent ratings. For example, if Real Madrid decided to follow Liverpool, then the ratings change to 0.5 for all three users!

6. Results on Larger Systems

In creating the larger data sets, the main issue lies in finding a group of connected users. If a user is not connected to any other user, then he or she plays no games, and thus the user's rank remains unchanged at a value of one-half. However, a user that plays no games is a user that does not follow any other users, and is not followed by any users. These unconnected users could skew the rankings as their unchanged rating would most likely fall near the middle, despite the user being largely unimportant as they do not contribute to the network by following or being followed. Such users could be removed from the linear system and given a low rating since it would not affect the interdependence of the connected network.

Figure 2:
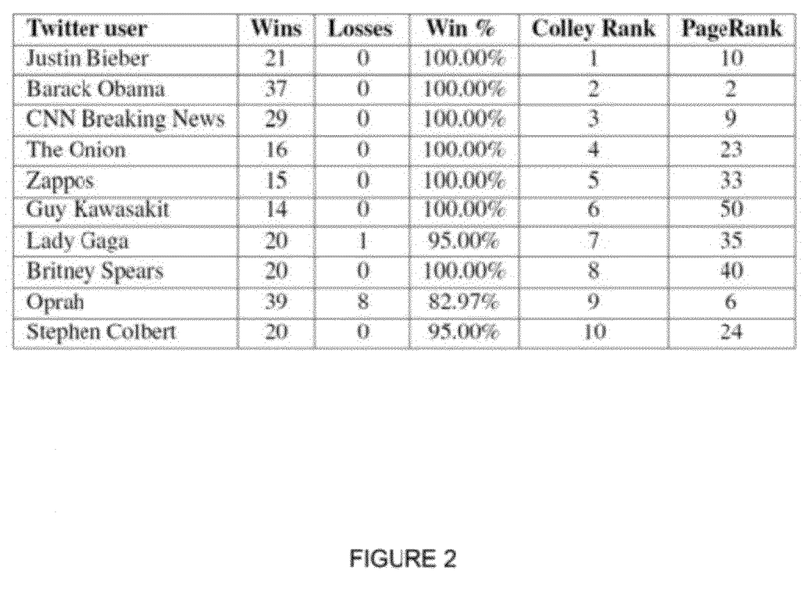
FIG. 2 shows a table of the top ten users when ranking the network of 100 of the top Twitter users (Data collected on Feb. 10, 2011).

As an example, a larger network was created that included a list of 100 celebrities. Using the website "WeFollow," a list was compiled of top Twitter users who are either celebrities or well-known users in the network. In the Table shown in FIG. 2, the top 10 users are shown when the algorithm of the invention is used to generate the Colley Rank on this list. Notice that the number of wins does not decide the top ranked user. Rather, it's the quality of the wins. Despite having 16 more wins, Barack Obama is ranked lower than Justin Bieber, indicating his followers are lower ranked users and thus less "important" than those who follow Justin Bieber.

Figure 3:
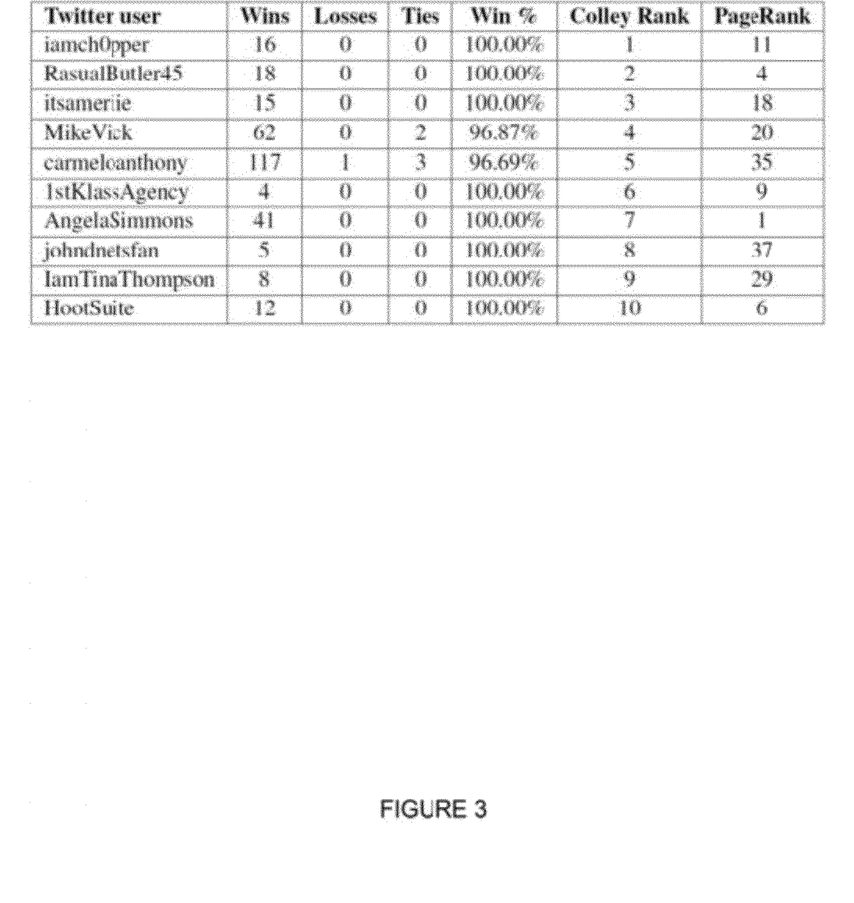
FIG. 3 shows a table of the top ten users of the network of 353 connected Twitter users.

To create a second larger network example, the first 500 friends of a particular user (in this case NBA star Dwight Howard) were determined. From this, the largest connected subset was found and used. This resulted in a list of 353 users, some celebrities, and some everyday people. The Table shown in FIG. 3 shows the results from applying the ranking algorithm on this network. Here the user iamch0pper claims the top spot with 16 wins and no losses or ties, while Angela Simmons, who has 41 wins and no losses or ties, falls to the seventh top ranked spot. Another interesting user is Carmelo Anthony (carmeloanthony). Despite having 117 wins and only 1 loss, he only comes in at the fifth ranked spot, thus further showing that the quality of the wins can be much more important than the quantity of wins.

7. Conclusions

Social networks, such as the Twitter network, are highly dynamic, and in many ways, more so than the Web. This dynamic nature can be better captured with the sports ranking models than it can with PageRank. One important advantage of many sports ranking methods, and specifically the Colley method, is the ability to play more than one game. This is very useful as a way to incorporate more information in the algorithm, which can provide an almost unlimited number of ways to expand and tweak the method. For example, with Twitter, there is more information suitable for ranking. It is possible for users to "retweet" other users tweets, sending out the comment to all of their followers, regardless of whether or not they follow the original tweeter. One way to interpret this action would be to count it as a new game played between the users. In this game, the retweeted user is the victor. Since this can be done as often as a user posts new tweets, the ability to include this information in a simple and effective way help to accurately determine importance among Twitter users.

Search engine algorithms, such as PageRank, only allow for one interaction between users. This interaction was intended only to indicate the probability of surfing from one webpage to another. If thought of in the context of sports ranking methods, all of the information that one wishes to incorporate would have to be wrapped up into one "super game." For example, to incorporate something like retweeting into PageRank, a new link could not be added to the network for each retweet, but rather, something more complicated would need to be done.

Another advantage to using sports ranking methods have over PageRank relates to "spamming." This issue arises with PageRank and many websites have found a variety of ways to increase PageRank and often employ these techniques without hesitation. Due to the distribution of the values of the ratings, those that fall in the "tail" are very sensitive to spamming.

The Colley sports ranking process may be less sensitive to spamming techniques, especially in its application to Twitter. First, due to the fact that the ratings "hover" around the value of one-half, no tail exists in the distribution of Colley ratings, which prevents a certain sensitivity to small changes in the network that exists in PageRank. Second, the results have shown that the quality of wins can be significantly more important than the quantity of wins. In theory, to successfully spam the method, a user would have to get numerous high ranked users to follow them. While this is certainly possible, if a user succeeds in doing this, one would argue that the user must be important. For example, if a user could get five of the top celebrity Twitter users to follow them, their ranking would surely jump significantly closer to the top. However, if the user manages to get people like Barack Obama and Justin Bieber to follow them, then there must be something special or important about that user.

While a foundational algorithm for discerning influential users of Twitter has been described, it is within the scope of the invention to include many other ways to expand the algorithm and incorporate a variety of relevant information. These expansions allow for numerous potential applications for the method in a variety of settings. First, this approach to ranking could be used in algorithms that search content in tweets. If combined with a text matching function, the rankings would provide an ordering in which the results could be displayed, with tweets by the most "important" users at the top. Another application could be recommending which users to follow. Users who have tendencies similar to the user of interest would be recommended with the most influential users recommended highest.

Additionally, other sports-based ranking methods are also contemplated by the invention. These ranking methods include the Massey method and the like. The Massey method for ranking items revolves around the rule that the difference in the ratings of two teams i and j, denoted $r_i$-$r_j$, represents the point differential in a matchup of these two teams. Also like Colley, the Massey method can be succinctly summarized with one linear system:

$$Mr=p,$$

Additionally, weighting methods may be applied to the process of the invention. For example, one could weight recent "retweets" and "mentions" more heavily. Alternatively or additionally, a simple weighting function such as linear weighting may be used. For example, in a linearly weighted Colley method, the weights may lie between 0 and 1 with the highest weight occurring on the last day of a time period. Games that occur on the same day are given the same weight. Games at the beginning of a time period are given no weight. Other forms of weighting may additionally or alternatively be used. For example, logarithmic weighting, step function weighting, non-temporal weighting, and so on.

Other options for weighting may be by the use of keywords. Anything not related to a topic of interest is ½ a game. Anything of interest is counted as 1 game. This would make all content of interest emphasized and could allow one to mine out who are the more influential voices and accounts of particular content.

The invention also integrates the idea of clustering. A number of clustering algorithms exist and can mine different types of information from large datasets. Clustering methods group data according to a mathematical measure of similarity. In the method of the invention, Twitter users may be clustered into groups. The user would need to define what content determines the clustering. For instance, one can cluster the textual content of tweets. One could cluster on the accounts that each Twitter user follows. In this way, a cluster could represent a group of users who have similar followers. Then, weighting, in the sports ranking method, may be integrated by determining the weight for tweets that mention or are retweeted in a cluster versus out of a cluster. For instance, suppose Nintendo (@NintendoAmerica) is interested in everyone in its cluster. It could have higher weight for retweets that are within its cluster.

Similarly, it could give higher weight to retweets that actually go outside the cluster. Nintendo could, for example, also filter such games so they have to relate to tweets that have certain textual content. For example, suppose a tweet is directed to Mario 3D. Then, games are upweighted if someone in the cluster is able to get retweeting from accounts outside the cluster of Nintendo-related Twitter users. For this example, the algorithm is rewarding users who can spread the word about a Nintendo product.

A further application of the ranking system and process of invention may be searching algorithms for content in tweets. The algorithm may be applied to search applications, possibly including weighting and taking into account higher ranked users' content.

A further application of the ranking system and process of invention may be individualized search. The ranking system and process of invention may be used as a personalized ranking method that is customized to a particular users' tendencies on Twitter. This aspect of the algorithm is contemplated for use with the Massey ranking process.

A further application of the ranking system and process of the invention may be used to implement a recommendation system. The recommendation system may be implemented to recommend users to follow. It is important to note that this application may require clustering. In one aspect, a user can ask for recommendations of users to follow. Users who have tendencies similar to the user of interest would be recommended with the most influential users recommended highest.

In accordance with various embodiments of the invention, the methods described herein are intended for operation as software programs running on a computer processor. Furthermore, alternative software implementations including, but not limited to, distributed processing, component/object distributed processing, parallel processing, virtual machine processing, cloud computing, any future enhancements, or any future protocols thereof may also be used to implement the methods described herein.

Additionally, the various embodiments are intended for use with platforms of the specific social network. If implemented with Twitter, this includes Twitter for Websites, Search API, REST API, and the'Streaming API. As is known, Twitter for Websites (TfW) is a suite of products that enables websites to easily integrate Twitter. The Search API is designed for products looking to allow a user to query for Twitter content. This may include finding a set of tweets with specific keywords, finding tweets referencing a specific user, or finding tweets from a particular user. The REST API enables developers to access some of the core primitives of Twitter including timelines, status updates, and user information. The Streaming API is the real-time sample of the Twitter Firehose. This API is for those developers with data intensive needs.

Further in accordance with various embodiments of the invention, the methods described herein are intended for operation with dedicated hardware implementations including, but not limited to, PCs, PDAs, semiconductors, application specific integrated circuits (ASIC), programmable logic arrays, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A non-transitory tangible storage medium executed on a computer system that ranks at least one of the quality and importance of content on a social network, the non-transitory tangible storage medium executed on the computer system comprising:
    instructions for monitoring actions and information of social network users, wherein the social network comprises twitter;
    instructions for modeling and fitting the actions and information of the social network users to a predefined definition of a weighted game between at least two social network users, wherein the actions comprise one social network user following another social network user;
    instructions for determining the results of the weighted game between the at least two social network users based on the one social network user following the another social network user;
    instructions for applying a sports ranking algorithm to the results between the at least two social network users based on the one social network user following the another social network user; and
    instructions for determining a rank of at least one of the quality and importance of content of the social network users based on an outcome of the sports ranking algorithm based on the one social network user following the another social network user.

2. The non-transitory tangible storage medium executed on the computer system of claim 1, wherein applying the sports ranking algorithm comprises applying a Colley method sports ranking algorithm.

3. The non-transitory tangible storage medium executed on the computer system of claim 1, wherein applying the sports ranking algorithm comprises applying a Massey method sports ranking algorithm.

4. The non-transitory tangible storage medium executed on the computer system of claim 1, wherein applying the sports ranking algorithm comprises applying a Colley method sports ranking algorithm with weighting factors.

5. The non-transitory tangible storage medium executed on the computer system of claim 4, wherein the weighting comprises at least one of logarithmic weighting, step function weighting, and non-temporal weighting.

6. The non-transitory tangible storage medium executed on the computer system of claim 1, wherein applying the sports ranking algorithm comprises applying a Massey method sports ranking algorithm with weighting factors.

7. The non-transitory tangible storage medium executed on the computer system of claim 6, wherein the weighting comprises at least one of logarithmic weighting, step function weighting, and non-temporal weighting.

8. The non-transitory tangible storage medium executed on the computer system of claim 1, further comprising instructions for clustering group data according to a mathematical measure of similarity to rank at least one of the quality and importance of content of the social network users.

9. The non-transitory tangible storage medium executed on the computer system of claim 1, further comprising instructions for searching for content in tweets to rank at least one of the quality and importance of content of the social network users.

10. The non-transitory tangible storage medium executed on the computer system of claim 1, further comprising instructions for providing recommendations to users who have tendencies similar to a user whose content is ranked higher in one of quality and importance.

11. A process for ranking at least one of the quality and importance of content on a social network utilizing a computer system comprising:
    monitoring one of actions and information of social network users with the computer system, wherein the social network comprises twitter;
    modeling and fitting the actions and information of the social network users to a predefined definition of a game between at least two social network users with the computer system, wherein the actions comprise one social network user following another social network user;
    determining the results of the game between the at least two social network users with the computer system based on the one social network user following the another social network user;
    applying a sports ranking algorithm to the results between the at least two social network users with the computer system based on the one social network user following the another social network user; and
    determining a rank of at least one of the quality and importance of content of the social network users based on an outcome of the sports ranking algorithm with the computer system based on the one social network user following the another social network user.

12. The process of claim 11, wherein applying the sports ranking algorithm comprises applying a Colley method sports ranking algorithm.

13. The process of claim 11, wherein applying the sports ranking algorithm comprises applying a Massey method sports ranking algorithm.

14. The process of claim 11, wherein applying the sports ranking algorithm comprises applying a Colley method sports ranking algorithm with weighting factors.

15. The process of claim 14, wherein the weighting comprises at least one of logarithmic weighting, step function weighting, and non-temporal weighting.

16. The process of claim 11, wherein applying the sports ranking algorithm comprises applying a Massey method sports ranking algorithm factors.

17. The process of claim 16, wherein the weighting comprises at least one of logarithmic weighting, step function weighting, and non-temporal weighting.

18. The process of claim 11, further comprising clustering group data according to a mathematical measure of similarity to rank at least one of the quality and importance of content of the social network users.

19. The process of claim 11, further comprising searching for content in tweets to rank at least one of the quality and importance of content of the social network users.

20. The process of claim 11, further comprising providing recommendations to users who have tendencies similar to a user whose content is ranked higher in one of quality and importance.

* * * * *